(12) United States Patent
Shen et al.

(10) Patent No.: US 6,336,195 B1
(45) Date of Patent: Jan. 1, 2002

(54) METHOD FOR DEBUGGING KEYBOARD BASIC INPUT/OUTPUT SYSTEM (KB-BIOS) IN A DEVELOPMENT NOTEBOOK COMPUTING SYSTEM

(75) Inventors: Yi-Hung Shen; Tzu-Wen Lin, both of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/291,183

(22) Filed: Apr. 14, 1999

(51) Int. Cl.[7] .......................... H02H 3/05; H03K 19/003

(52) U.S. Cl. .............................. 714/34; 714/56; 710/65

(58) Field of Search ............................... 714/43, 38, 31, 714/32, 44, 56; 710/8, 15, 20, 48, 52, 65

(56) References Cited

U.S. PATENT DOCUMENTS

| | | | |
|---|---|---|---|
| 5,615,331 A | | 3/1997 | Toorians et al. ....... 395/183.14 |
| 5,892,943 A | * | 4/1999 | Rockford et al. .............. 713/2 |
| 6,065,081 A | * | 5/2000 | Stancil et al. ................ 710/104 |
| 6,142,683 A | * | 11/2000 | Madduri ........................ 717/4 |
| 6,175,914 B1 | * | 1/2001 | Mann ........................... 712/227 |
| 6,189,140 B1 | * | 2/2001 | Madduri ........................ 717/4 |

* cited by examiner

Primary Examiner—Dieu-Minh Le
(74) Attorney, Agent, or Firm—Pillsbury Winthrop LLP

(57) ABSTRACT

In a computer-implemented method for debugging keyboard basic input/output system (KB-BIOS) in a development notebook computing system, a serial PS/2 port, that is connected to a KB-BIOS processor and that serves as a communications channel, of the development notebook computing system is coupled to a host computer so as to establish communication between the KB-BIOS and the host computer. Thereafter, a debug command is sent from the host computer to the development notebook computing system via the serial PS/2 port. Subsequently, at the development notebook computing system, the debug command sent by the host computer via the serial PS/2 port is directed to the KB-BIOS processor so as to enable the latter to execute the debug command according to program instructions in a debug engine module that resides in a memory of the KB-BIOS, and to send debug data associated with the development notebook computing system to the host computer via the serial PS/2 port in response to execution of the debug command. In this way, KB-BIOS debugging of the development notebook computing system can proceed without assistance from system BIOS of the development notebook computing system.

2 Claims, 6 Drawing Sheets

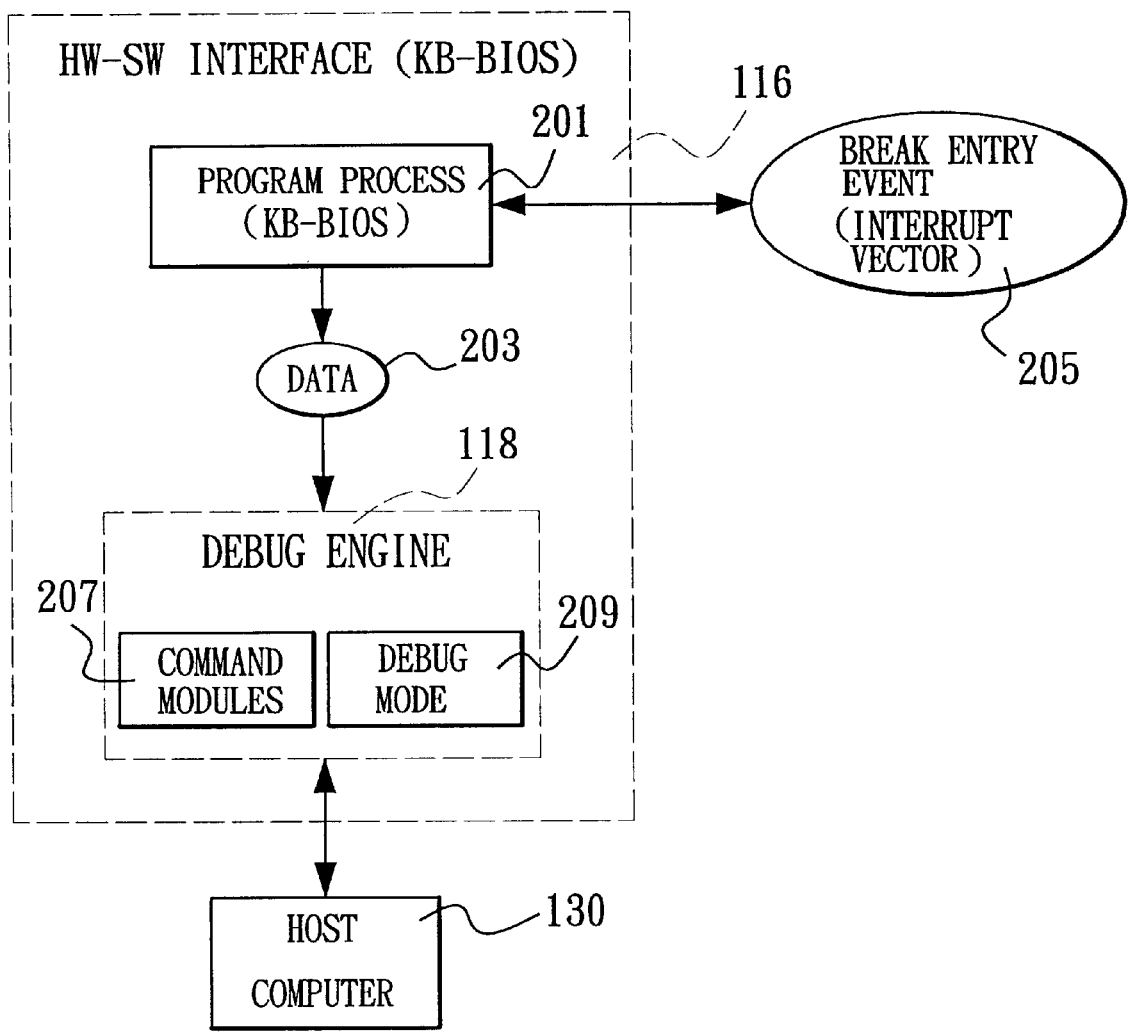
F I G. 4

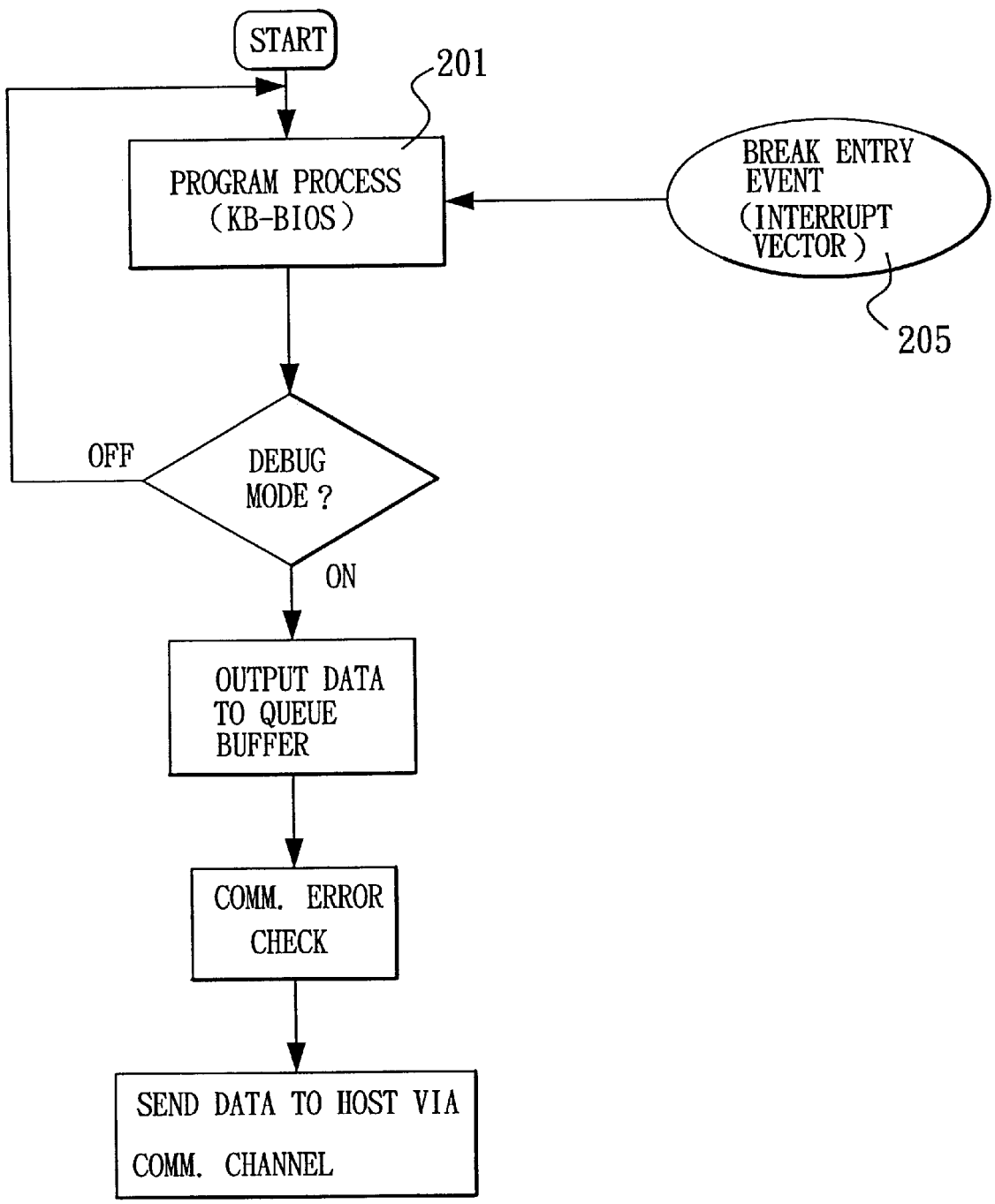
F I G. 5

METHOD FOR DEBUGGING KEYBOARD BASIC INPUT/OUTPUT SYSTEM (KB-BIOS) IN A DEVELOPMENT NOTEBOOK COMPUTING SYSTEM

BACKGROUND OF THE INVENTION

1. Field of the Invention

The invention relates to a method for debugging a computing system, more particularly to a method for debugging keyboard basic input/output system (KB-BIOS) in a development notebook computing system.

2. Description of the Related Art

The architecture of a conventional computing system can be generally defined using functional layers. The lowest functional layer is the actual machine or hardware, whereas the highest functional layer is the application program for interfacing with the user. Between the hardware and the application program, there is provided the system software that is composed of several elements, including the operating system kernel and shell, the device drivers, and in some instances, the multitasking supervisor.

Conventional computing systems further include a system basic input/output system (SYS-BIOS) between the hardware and the system software. Notebook computing systems additionally include a keyboard basic input/output system (KB-BIOS) between some of the hardware and the SYS-BIOS. Referring to FIG. 1, in a notebook computing system, the hardware associated with SYS-BIOS 10 include the floppy disk drive (FDD), the hard disk drive (HDD), the CD-ROM drive (CDROM), the PCMCIA port, the computer monitor (CRT), and the computer printer (LPT). On the other hand, the hardware associated with KB-BIOS 11 include the battery pack, the EEPROM, the thermal sensor, the internal keyboard (INT-KBD), and auxiliary ports (AUX1, AUX2) for the external keyboard (EXT-KBD) and the external PS/2 mouse. KB-BIOS 11 communicates with SYS-BIOS 10 via the ISA bus. KB-BIOS 11 insulates SYS-BIOS 10 from the hardware that is associated therewith, such as the internal keyboard and the PS/2 mouse, by providing basic I/O services and by processing interrupt signals that are generated by the hardware.

Most computing systems are mainly controlled through the use of interrupts, which can be generated by the microprocessor, by the system hardware, or by the software itself. KB-BIOS can provide a logical handling of the interrupt signals. When an interrupt occurs, processor control is transferred to an interrupt vector. The interrupt vector stores an address assigned by KB-BIOS. Routing to the correct service routine for execution subsequently occurs according to the stored address.

KB-BIOS Interrupt Service Routines (ISRs) handle interrupts issued by hardware devices. ISRs use registers in the processor, the memory (RAM) and the KB-BIOS data area. KB-BIOS also uses various GPIO ports.

It is known that debugging of BIOS in a computing system can be conveniently performed with the use of an in-circuit emulator (ICE). An ICE physically replaces the processor in a target or development machine. A host computer is connected to the ICE via a buffer. The ICE is connected to the development machine through another buffer. BIOS commands are received by the ICE through the buffers, and are processed using routines resident in a RAM of the ICE. As such, the BIOS of the development machine can accurately access the data in the RAM of the ICE.

ICE technology has many drawbacks. For example, ICE software can only run in expensive specially designed machines or processing equipment. An ICE tester requires removal of the microprocessor on the development machine, and a socket on the development machine for connection with the ICE tester. In addition, whenever a new microprocessor enters the market, ICE testing of a development machine using the new microprocessor is not possible unless system specific ICE software has already been developed therefor.

Software debugging programs, such as Soft-ICE, allow for analysis of BIOS commands issued by application programs. However, these systems require fully functional hardware, microprocessor, memory, stacker, BIOS and operating system on the development machine. Thus, only BIOS commands associated with the application program can be analyzed.

Conventional KB-BIOS debugging in a development notebook computing system is a fairly complicated task that involves sending of debug data to SYS-BIOS via port 60/64 or port 62/66 of the ISA bus for showing the debug data on the computer monitor (see FIG. 1). Therefore, conventional KB-BIOS debugging is not possible without the assistance of SYS-BIOS.

U.S. Pat. No. 5,615,331 discloses a BIOS-level real-time debugger for a development computing system. The debugger is resident in the development computing system and does not require external hardware circuitry for the debugging interface. In the aforesaid patent, it was not specified that the development computing system is a notebook computing system, and no distinction was made between SYS-BIOS and KB-BIOS. Thus, no disclosure was made regarding the debugging of KB-BIOS without the assistance of SYS-BIOS.

SUMMARY OF THE INVENTION

Therefore, the object of the present invention is to provide a low-cost, relatively simple, KB-BIOS-level real-time debugging method for a development notebook computing system. The method dispenses with external hardware circuitry for the debugging interface, and involves communicating of debugging information to a remote host computer via a serial PS/2 port without assistance from SYS-BIOS of the development notebook computing system.

According to the present invention, there is provided a computer-implemented method for debugging KB-BIOS in a development notebook computing system. The KB-BIOS includes a KB-BIOS processor and a memory that is coupled to the KB-BIOS processor and that has a resident debug engine module. The development notebook computing system further has a SYS-BIOS that is separate from the KB-BIOS and that communicates with the KB-BIOS via an ISA bus. The method comprises the steps of:

coupling a serial PS/2 port, that is connected to the KB-BIOS processor and that serves as a communications channel, of the development notebook computing system to a host computer so as to establish communication between the KB-BIOS and the host computer;

sending a debug command from the host computer to the development notebook computing system via the serial PS/2 port; and at the development notebook computing system, directing the debug command sent by the host computer via the serial PS/2 port and without passing through the ISA bus to the KB-BIOS processor so as to enable the KB-BIOS processor to execute the debug command according to program instructions in the debug engine module and to send debug data associated with the development notebook computing system to the host computer via the serial PS/2 port and without passing through the ISA bus in response to execution of the debug command.

As such, KB-BIOS debugging of the development notebook computing system can proceed without assistance from the SYS-BIOS.

Preferably, the debug data is written in a queue buffer in the KB-BIOS processor before sending the debug data to the host computer via the serial PS/2 port in order to increase debug data transmission speed to the host computer.

BRIEF DESCRIPTION OF THE DRAWINGS

Other features and advantages of the present invention will become apparent in the following detailed description of the preferred embodiment with reference to the accompanying drawings, of which:

FIG. 4 is a simplified block diagram illustrating a KB-BIOS module of the development notebook computing system shown in FIG. 2;

FIG. 5 is a flowchart illustrating how interrupts are handled according to the preferred embodiment.

DETAILED DESCRIPTION OF THE PREFERRED EMBODIMENT

Figure 1:
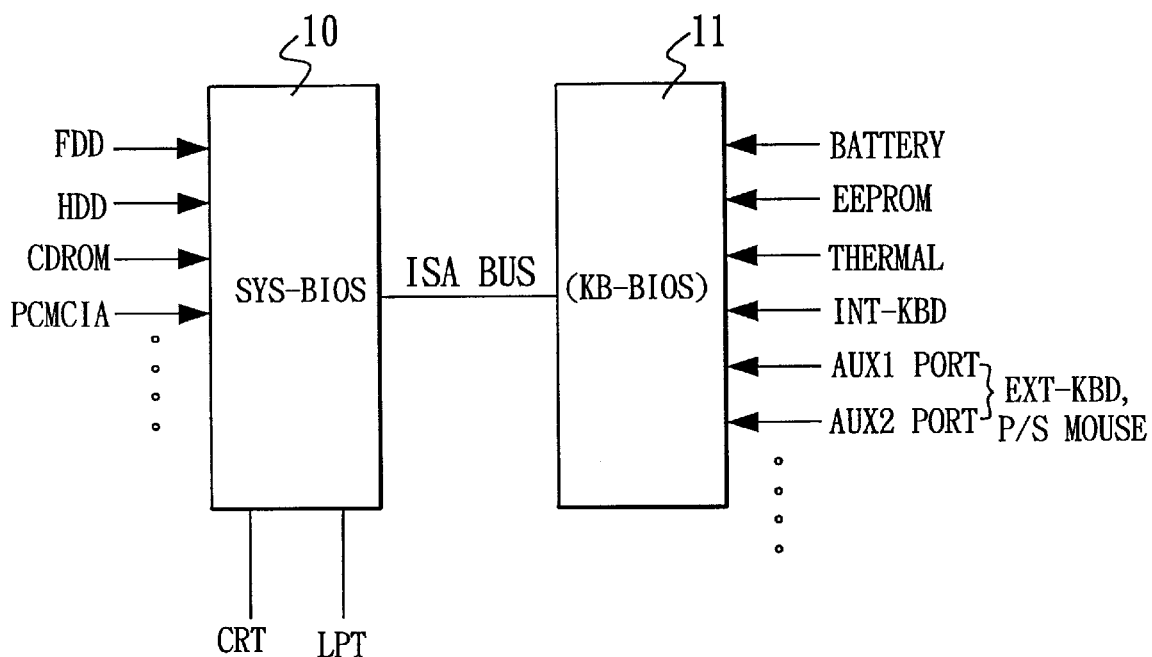
FIG. 1 is a block diagram illustrating the different hardware associated with SYS-BIOS and KB-BIOS in a conventional notebook computing system.
Figure 2:
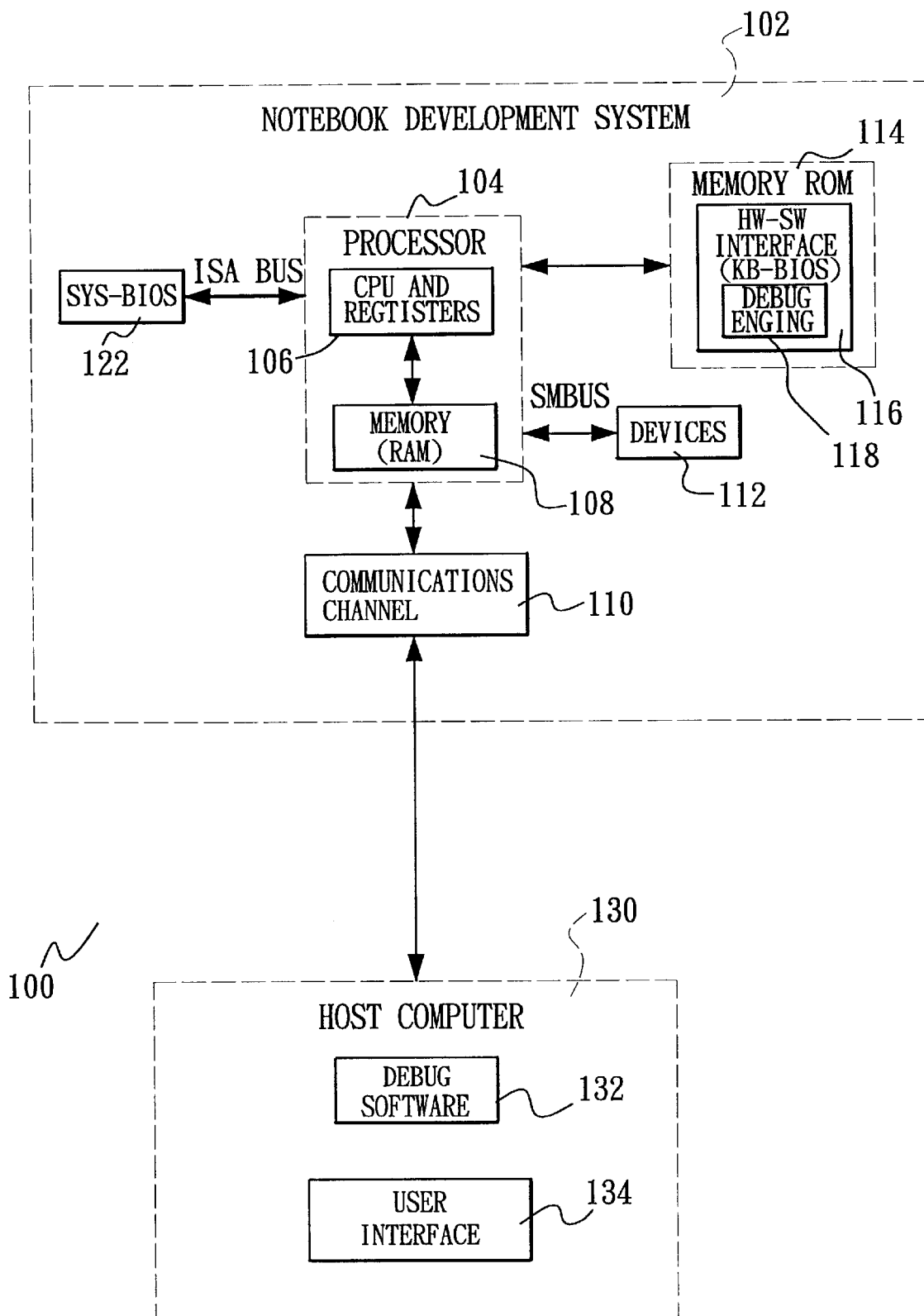
FIG. 2 is a simplified block diagram illustrating how the preferred embodiment of a KB-BIOS debugging method according to the present invention is implemented.

FIG. 2 illustrates a block diagram of software and hardware tools for implementing the preferred embodiment of the present KB-BIOS debugging invention 100. KB-BIOS debugging generally refers to the analysis of hardware signals (GPIO), registers, memories (RAM) or other peripheral devices, such as the battery pack, the thermal sensor or the EEPROM. Development system 102 is a notebook computing system that is under development and that is the subject of the KB-BIOS debugging operation. Development system 102 may be a computer or a computer sub-system, such as a computer board, and comprises KB-BIOS processor 104, communications channel 110, and memory 114. Processor 104 includes a central processing unit (CPU) 106, such as NS87570, H8, M38867, RISC processor and the like, or a similar computer-processing element. CPU 106 has internal registers. Processor 104 further includes a memory 108, such as a random access memory (RAM). Communications channel 110, which is connected to the processor 104, is a standard serial PS/2 port. Memory 114 is connected to the processor 104, and may be a conventional computer memory, such as RAM or ROM. In the preferred embodiment, memory 114 is a read-only memory (ROM), and is fabricated into a silicon chip.

Memory 114 comprises KB-BIOS module 116, which is a low-level interrupt-handling software system, for communication between hardware and software portions of development system 112. KB-BIOS module 116 comprises a debug engine module 118. As described in detail below, debug engine module 118 facilitates KB-BIOS debugging of development system 102 by allowing KB-BIOS debug data associated with development system 102 to be sent to a host computer 130. Host computer 130 sends KB-BIOS debug commands to processor 104, which executes the debug commands according to program instructions in debug engine module 118 and which sends the KB-BIOS debug data to host computer 130 in response to execution of the debug commands.

Development system 102 may further comprise additional devices 112, such as the battery pack, the thermal sensor and the EEPROM, connected to processor 104. The additional devices 112 communicate with processor 104 in a conventional manner according to the system management bus (SMBus) protocol.

Figure 3:
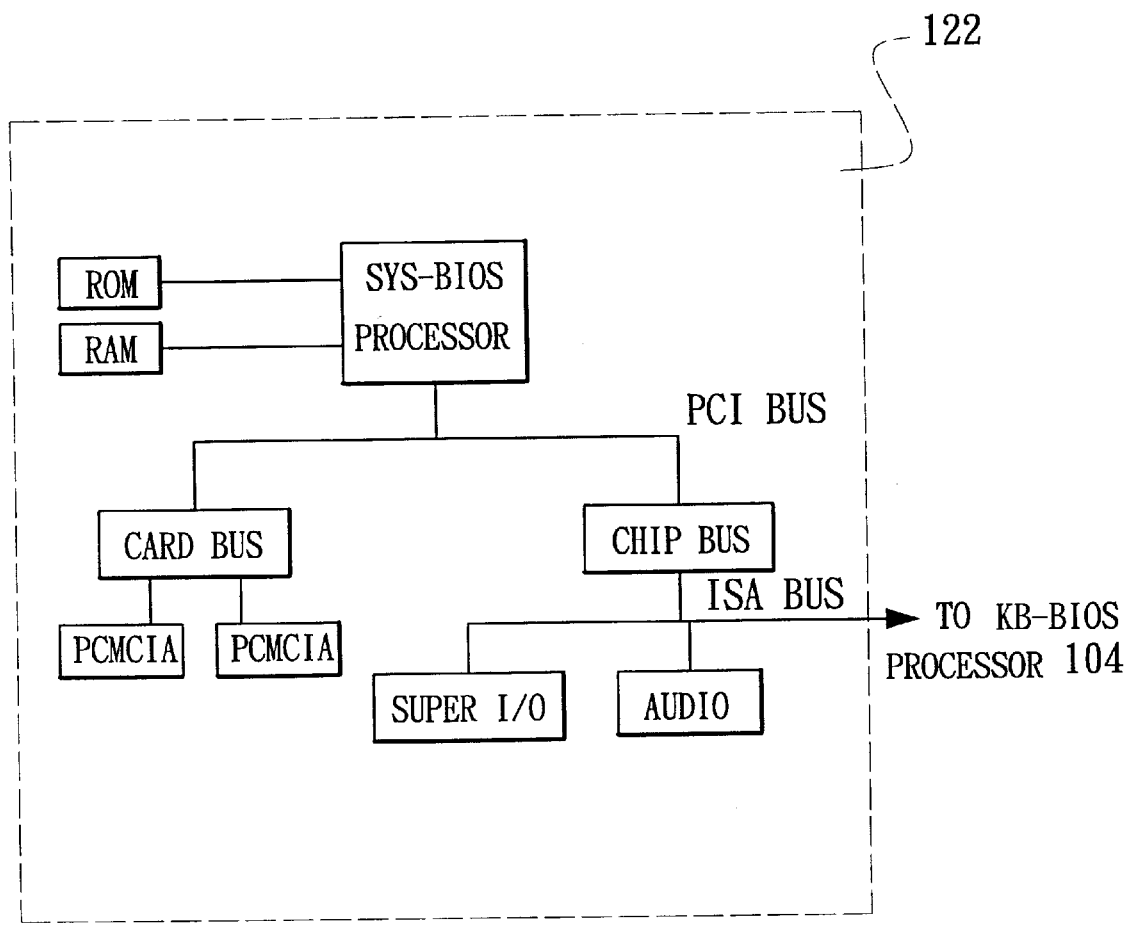
FIG. 3 is a simplified block diagram illustrating a SYS-BIOS segment of a development notebook computing system shown in FIG. 2.

Development system 102 may further comprise system BIOS or SYS-BIOS 122 operatively coupled to processor 104 via the ISA bus. FIG. 3 is a simplified block diagram illustrating SYS-BIOS 122 of development system 102. Since SYS-BIOS 122 of development system 102 is known in the art, and since the feature of the present invention does not reside in the particular configuration of SYS-BIOS 122, a detailed description of the same will be omitted herein for the sake of brevity.

Development system 102 is coupled to host computer 130 via a conventional cable that interconnects communications channel 110 and a corresponding port (not shown) on host computer 130. In the preferred embodiment, the cable is a conventional DB6 (6 pin) male to male serial transmission cable that is modified by removing pin 4 (+5 volt pin) of one of the connector ends thereof.

Host computer 130 can be a notebook computer or a desktop computer with a serial PS/2 port. Host computer 130 generally comprises a processor, a computer monitor, a computer keyboard and/or a computer mouse (not shown). In the present invention, host computer 130 comprises debug software 132 and user interface 134.

Debug software 132 provides KB-BIOS debugging tools and commands for development system 102. Command capabilities provided by debug software 132 comprise target information, host interface, SMBus data, memory dump, register dump, Port 60/64 and Port 62/66 output, battery pack register dump, H/W signal trace, entry/exit process, etc. A sample set of debug commands provided by debug software 132 can be found in Table I.

TABLE I

| | DEBUG COMMANDS |
|---|---|
| 0x01 | Mouse data byte output |
| 0x02 | IRQ1 register (HICTRL) output |
| 0x03 | IRQ12 register (HICTRL) output |
| 0x04 | SMI event output |
| 0x05 | SCI event output |
| 0x06 | Ring out event output |
| 0x07 | Pending flag output |
| 0x08 | INT-KBD scan code output |
| 0x09 | EXT-KBD scan code output |
| 0x0A | HIF1 command |
| 0x0B | HIF1 data |
| 0x0C | HIF2 command |
| 0x0D | HIF2 data |
| 0x11 | Core code RAM output |
| 0x12 | OEM code RAM output |
| 0x13 | Battery RAM output |
| 0x14 | EC name space RAM output |
| 0x15 | Check pointer (core code) RAM output |
| 0x16 | 87570 register output |
| 0x17 | 87570 register output |

TABLE I-continued

DEBUG COMMANDS

| | |
|---|---|
| 0x18 | Extend I/O port output |
| 0x19 | Digital scope output |
| 0x1A | Check pointer (OEM code) RAM output |
| 0x80 | Port 60/64 command group |
| 0x81 | Command output, SYS-BIOS to KB-BIOS |
| 0x82 | Data output, SYS-BIOS to KB-BIOS |
| 0x83 | Data output, KB-BIOS to SYS-BIOS |
| 0x90 | Port 62/66 command group |
| 0x91 | Command output, SYS-BIOS to KB-BIOS |
| 0x92 | Data output, SYS-BIOS to KB-BIOS |
| 0x93 | Data output, KB-BIOS to SYS-BIOS |
| 0xA0 | SMBus output |
| 0xA1 | EEPROM output |
| 0xA2 | Thermal sensor output |
| 0xA3 | Smart battery output |
| 0xA4 | Smart selector output |
| 0xA5 | Smart charger output |
| 0xAA | SMBus data output (host to slave) |
| 0xAB | SMBus data output (slave to host) |
| 0xAC | SMBus status output (0:success; 1:fail) |
| 0xAD | SMBus stop signal output |
| 0x70 | Exit monitoring mode |
| 0x71 | Output monitoring end data at AUX_Port1 |
| 0x72 | Output monitoring end data at AUX_Port2 |
| 0x73 | Send confirm ID to target end, begin LOGIN |
| 0x7A | Local operation |
| 0x7B | Reserved |
| 0x7C | Reserved |
| 0x7D | Reserved |
| 0x7E | Output debug data |
| 0x7F | ACK output |

User interface 134 provides the option of displaying the debug data from development system 102 and the debug commands. User interface 134 also provides conventional editing of object hardware, such as RAM, I/O ports, registers, and the like.

FIG. 4 is a simplified block diagram illustrating KB-BIOS module 116, which includes debug engine module 118. As mentioned beforehand, debug engine module 118 facilitates KB-BIOS debugging of development system 102 by allowing debug data 203 to be sent to host computer 130. After a log-in operation, host computer 130 sends debug commands to development system 102. According to program instructions in debug engine module 118, the debug commands are executed by processor 104 of development system 102, and debug data 203 associated with development system 102 are sent to host computer 130 in response to execution of the debug commands. Debug engine module 118 itself requires approximately 4 kilobytes of memory space in KB-BIOS module 116. A flowchart of the interrupt-handling and debug command processing of debug engine module 118 is further described below with reference to FIGS. 5 and 6.

During operation of development system 102, certain events or interrupts 205 or initiation of KB-BIOS program process 201 in KB-BIOS module 116 will generate debug data 203. Debug engine module 118, which controls output of debug data 203, and comprises various command modules 207 for executing various debug commands, such as memory dump, register dump, stop transmission, and the like. Debug engine module 118 controls reception by development system 102 of the debug commands from host computer 130 via communications channel 110, which are then executed according to program instructions of command modules 207.

Debug commands may be entered by the user through debug software 132 and/or user interface 134 of host computer 130. Thus, the user is able to debug remotely and interactively KB-BIOS of development system 102 via communications channel 110. Debug mode 209 of debug engine module 118 may be selectively set by the user to alter program process 201 such that debug codes are not resident in KB-BIOS module 116 when the latter runs. In the preferred embodiment, debug mode 209 can be turned off or turned on by modifying the variable KB_DEBUG_MODE in the \oem\project\oembld.mak file to one of $(OFF) or $(ON). When debug mode 209 is turned on, debug commands can be sent to development system 102, and debug data can be received by host computer 130 via communications channel 110.

Figure 6:
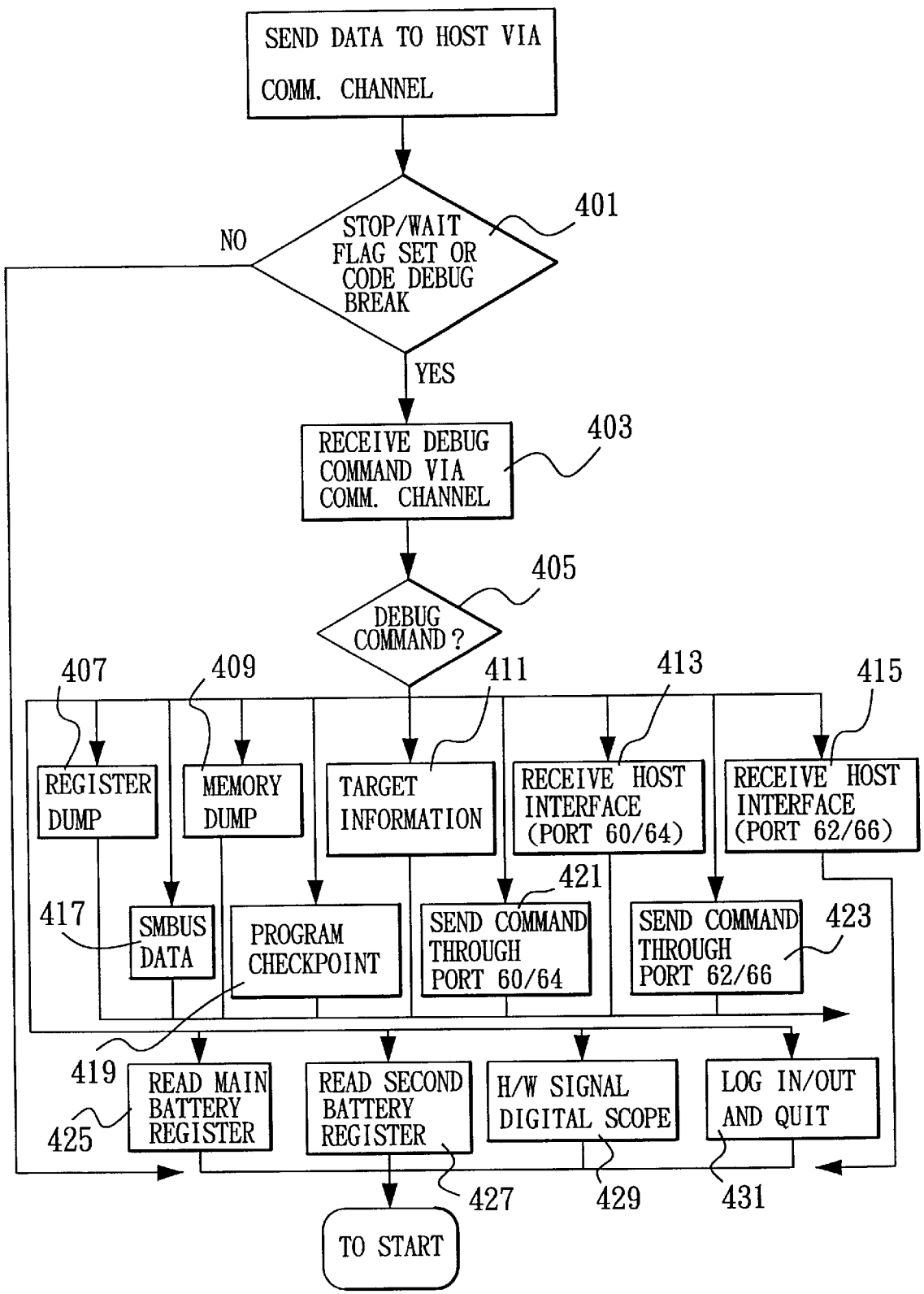
FIG. 6 is a continuation of the flowchart shown in FIG. 5, and illustrates how debug commands are processed according to the preferred embodiment.

FIGS. 5 and 6 illustrate a flowchart of the preferred embodiment of the KB-BIOS debugging method of the present invention. Unless debug mode 209 is turned off, which disables the KB-BIOS debugging operation, program process 201 and break entry event 205 can be used to enter debug engine module 118. When debug mode 209 is turned off, data will not be sent to communications channel 110, and a return is made to program process 201 for continued execution. On the other hand, when debug mode 209 is turned on, data will be written into a queue buffer in memory 108 of processor 104 (see FIG. 2). After a communication channel error check is made, data in the queue buffer is sent to host computer 130 via the communications channel 110.

The method illustrated in the flowchart of FIG. 5 continues in FIG. 6. Once data has been sent to host computer 130 via communications channel 110, it is determined in step 401 if a stop/wait flag is set, or if another debug command is to be received. If the determination made at step 401 is "No," the flow returns to program process 201 such that development system 102 continues to send debug data to host computer 130 via communications channel 110.

If the determination made at step 410 is "Yes," the flow proceeds to step 403, where development system 102 receives the debug command from host computer 130 via communications channel 110. In step 405, the appropriate response to the debug command received from host computer 130 is determined. As mentioned beforehand, debug commands, such as those listed in Table I, may be issued to development system 102 by debug software 132 of host computer 130 via communications channel 110. Debug engine module 118 comprises command modules 407–431 that control, for example, execution of the debug command on development system 102, sending of data to host computer 130, and returning to program process 201.

In the preferred embodiment, debug engine module 118 may comprise the following command modules in order to execute the corresponding debug command: register dump 407 reads the registers of the processor 104; memory dump 409 reads the memory 108 of the processor 104; target information 411; receive host interface (port 60/64) 413 sends out data at port 60/64; receive host interface (port 62/66) 415 sends out data at port 62/66; SMBus data 417 sends out communication data of devices 112; program checkpoint 419 monitors the program execution sequence; send command through port 60/64 421 enables the user to send the port 60/64 command directly to development system 102 via debug software 132; send command through port 62/66 423 enables the user to send the port 62/66 command directly to development system 102 via debug software 132; read main battery register 425 reads registers of a first smart battery according to the SMBus protocol; read second battery register 427 reads registers of a second smart battery according to the SMBus protocol; H/W signal digital scope 429 reads I/O port and internal GPIO of processor 104 so that hardware signals can be measured directly without using an oscilloscope; and log in/out and quit 431 enables development system 102 to enter or exit debug mode or stop data transmission.

It has thus been shown that, according to the debugging method of this invention, the debug engine module of a development notebook computing system resides in the KB-BIOS segment. Interrupt-handling proceeds by writing debug data associated with the development notebook computing system directly into a queue buffer in a memory of a KB-BIOS processor. According to program instructions in the debug engine module, the debug data in the queue buffer are sent to a serial PS/2 port, which serves as a communications channel, for reception by a remote host computer. By virtue of the queue buffer, debug data transmission speed to the host computer can be increased. Debug commands (such as register dump, GPIO dump) issued from the host computer are sent to the KB-BIOS processor of the development notebook computing system via the serial PS/2 port and without passing through the ISA bus. The debug commands are processed in accordance with program instructions in the debug engine module. Debug data associated with the development notebook computing system are sent to the host computer via the serial PS/2 port and without passing through the ISA bus in response to execution of the debug commands. In this way, the user can debug interactively and remotely KB-BIOS of the development notebook computing system without assistance from the SYS-BIOS of the latter.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A computer-implemented method for debugging keyboard basic input/output system (KB-BIOS) in a development notebook computing system, the KB-BIOS including a KB-BIOS processor and a memory that is coupled to the KB-BIOS processor and that has a resident debug engine module, the development notebook computing system further having a system BIOS (SYS-BIOS) that is separate from the KB-BIOS and that communicates with the KB-BIOS via an ISA bus, the method comprising the steps of:

coupling a serial PS/2 port, that is connected to the KB-BIOS processor and that serves as a communications channel, of the development notebook computing system to a host computer so as to establish communication between the KB-BIOS and the host computer;

sending a debug command from the host computer to the development notebook computing system via the serial PS/2 port; and at the development notebook computing system, directing the debug command sent by the host computer via the serial PS/2 port and without passing through the ISA bus to the KB-BIOS processor so as to enable the KB-BIOS processor to execute the debug command according to program instructions in the debug engine module and to send debug data associated with the development notebook computing system to the host computer via the serial PS/2 port and without passing through the ISA bus in response to execution of the debug command;

whereby, KB-BIOS debugging of the development notebook computing system can proceed without assistance from the SYS-BIOS.

2. The computer-implemented method of claim 1, further comprising the step of:

writing the debug data in a queue buffer in the KB-BIOS processor before sending the debug data to the host computer via the serial PS/2 port to increase debug data transmission speed to the host computer.

* * * * *